United States Patent
Tabeling et al.

(10) Patent No.: US 7,970,587 B2
(45) Date of Patent: Jun. 28, 2011

(54) SYSTEM AND METHOD FOR DEFINING PART INTERFACES

(75) Inventors: Thomas Tabeling, Cincinnati, OH (US); Edward Jagodzinski, Loveland, OH (US)

(73) Assignee: Siemens Industry, Inc., Alpharetta, GA (US)

( * ) Notice: Subject to any disclaimer, the term of this patent is extended or adjusted under 35 U.S.C. 154(b) by 597 days.

(21) Appl. No.: 12/052,519

(22) Filed: Mar. 20, 2008

(65) Prior Publication Data
US 2008/0294388 A1   Nov. 27, 2008

Related U.S. Application Data

(60) Provisional application No. 60/896,665, filed on Mar. 23, 2007.

(51) Int. Cl.
G06F 17/50 (2006.01)
(52) U.S. Cl. .......................................................... 703/1
(58) Field of Classification Search .................. 703/1
See application file for complete search history.

(56) References Cited

U.S. PATENT DOCUMENTS

| | | | | |
|---|---|---|---|---|
| 5,251,290 A | * | 10/1993 | Pabon | 345/420 |
| 5,323,333 A | * | 6/1994 | Johnson | 703/1 |
| 5,355,445 A | * | 10/1994 | Shibao et al. | 706/50 |
| 5,485,390 A | * | 1/1996 | LeClair et al. | 700/182 |
| 5,701,403 A | * | 12/1997 | Watanabe et al. | 345/419 |
| 6,110,213 A | * | 8/2000 | Vinciarelli et al. | 703/1 |
| 6,219,049 B1 | * | 4/2001 | Zuffante et al. | 715/764 |
| 6,629,065 B1 | * | 9/2003 | Gadh et al. | 703/1 |
| 6,718,218 B1 | | 4/2004 | Matheson | |
| 7,479,959 B2 | * | 1/2009 | Han et al. | 345/420 |
| 7,590,497 B2 | * | 9/2009 | Tornquist et al. | 702/42 |
| 2003/0060913 A1 | * | 3/2003 | Turner et al. | 700/103 |
| 2003/0067487 A1 | | 4/2003 | Kohls | |
| 2003/0103089 A1 | * | 6/2003 | Ramani et al. | 345/848 |
| 2003/0114947 A1 | * | 6/2003 | Tanaguchi | 700/98 |
| 2005/0188348 A1 | * | 8/2005 | Han et al. | 717/105 |

FOREIGN PATENT DOCUMENTS

| | | |
|---|---|---|
| JP | 6348746 A | 12/1994 |
| JP | 10320452 A | 12/1998 |
| JP | 11319971 A | 11/1999 |
| JP | 2001201408 A | 7/2001 |

OTHER PUBLICATIONS

"RSTestStand Enterprise, For Planning and Testing Your Control System", Rockwell Automation, Rockwell Software Inc., Sep. 10, 2004, 187 pages.*
International Search Report for PCT/US2008/003763 Dated Jul. 29, 2008.
Sohrt W et al: "Interaction with constraints in 3D modeling" Proceedings. Symposium on Solid Modeling Foundations and CAD/CAM Applications, XX, XX, Jun. 5, 1991 pp. 387-396.

* cited by examiner

Primary Examiner — Dwin M Craig
(74) Attorney, Agent, or Firm — Michael J. Wallace, Jr.

(57) ABSTRACT

A system, method, and computer program for defining part interfaces. A method includes comprising selecting a part. The method includes accessing a rule view corresponding to said part and setting a rule to a reference use. The rule limits the part to the reference use for a plurality of other parts.

20 Claims, 4 Drawing Sheets

SYSTEM AND METHOD FOR DEFINING PART INTERFACES

CROSS-REFERENCE TO RELATED APPLICATIONS

This Application claims priority to pending Provisional U.S. application Ser. No. 60/896,665, filed on Mar. 23, 2007.

TECHNICAL FIELD

The presently preferred embodiment of the innovations described herein relate generally to software applications. More specifically, the presently preferred embodiment relates to defining part interfaces in a CAD application.

BACKGROUND

Current CAD applications allow a user to define parent-child relationships (links) between objects, such as geometry, expressions, and parts. The user, unfortunately, cannot control what objects within a part may be used to create a relationship to another related or derived part. Similarly, the user cannot specify mating points/geometry that are needed to assemble standard and reusable parts when they are used in other assemblies. Consequently, users can create unmanageable dependencies, etc., that are too complex to understand. In many cases, the user may reach interdependent situations that do not have a solution.

In order to trace the interdependencies, the CAD systems of today, require that the inter-connected parts, etc., be fully loaded into memory. As the assemblies grow in complexity, however, this load requirement is not always practicable when all of the parts are not known. Even if all of the parts are known, they may not all fit into a memory load. Consequently, it is often times difficult for the user to determine what part files will be impacted when a particular object in another part file is changed or deleted.

What is needed is a system and method that allows users the ability to define and control dependencies at a part level so the original designer of the part can limit or eliminate dependencies placed upon the part, as well as determine which parts are compatible in an assembly without having to load the parts in to a CAD system to visually inspect them.

SUMMARY

To achieve the foregoing, and in accordance with the purpose of the presently preferred embodiment as described herein, the present application provides a computer implemented method for defining part interfaces, comprising selecting a part; accessing a rule view corresponding to said part; and setting a rule to a reference use; whereby said rule limits said part to said reference use for a plurality of other parts. The method, further comprising displaying said part to a user. The method, wherein said setting said rule to said reference use occurs in said rule view. The method, wherein said reference use is an inter-part linking. The method, wherein said reference use is an assembly constraint. The method, wherein said rule is one of an allow, an encourage, and a restrict. The method, wherein an owner sets said rule to said reference use. The method, wherein said owner restricts a linking property of said part. The method, wherein said linking property is an intra-part linking property.

An advantage of the presently preferred embodiment is to provide a computer-program product tangibly embodied in a machine readable medium to perform a method for defining part interfaces, comprising select a part; access a rule view corresponding to said part; and set a rule to a reference use; whereby said rule limits said part to said reference use for a plurality of other parts. The computer-program product, further comprising instructions to display said part to a user. The computer-program product, wherein said setting said rule to said reference use occurs in said rule view. The computer-program product, wherein said reference use is an inter-part linking. The computer-program product, wherein said reference use is an assembly constraint. The computer-program product, wherein said rule is one of an allow, an encourage, and a restrict. The computer-program product, wherein an owner sets said rule to said reference use. The computer-program product, wherein said owner restricts a linking property of said part. The computer-program product, wherein said linking property is an intra-part linking property.

Another advantage of the presently preferred embodiment is to provide a data processing system having at least a processor and accessible memory to implement a method for defining part interfaces, comprising means for selecting a part; means for accessing a rule view corresponding to said part; and means for setting a rule to a reference use. The data process system, further comprising means for restricting a linking property of said part Other advantages of the presently preferred embodiment will be set forth in part in the description and in the drawings that follow, and, in part will be learned by practice of the presently preferred embodiment. The presently preferred embodiment will now be described with reference made to the following Figures that form a part hereof. It is understood that other embodiments may be utilized and changes may be made without departing from the scope of the presently preferred embodiment.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

Computer System

Figure 4:
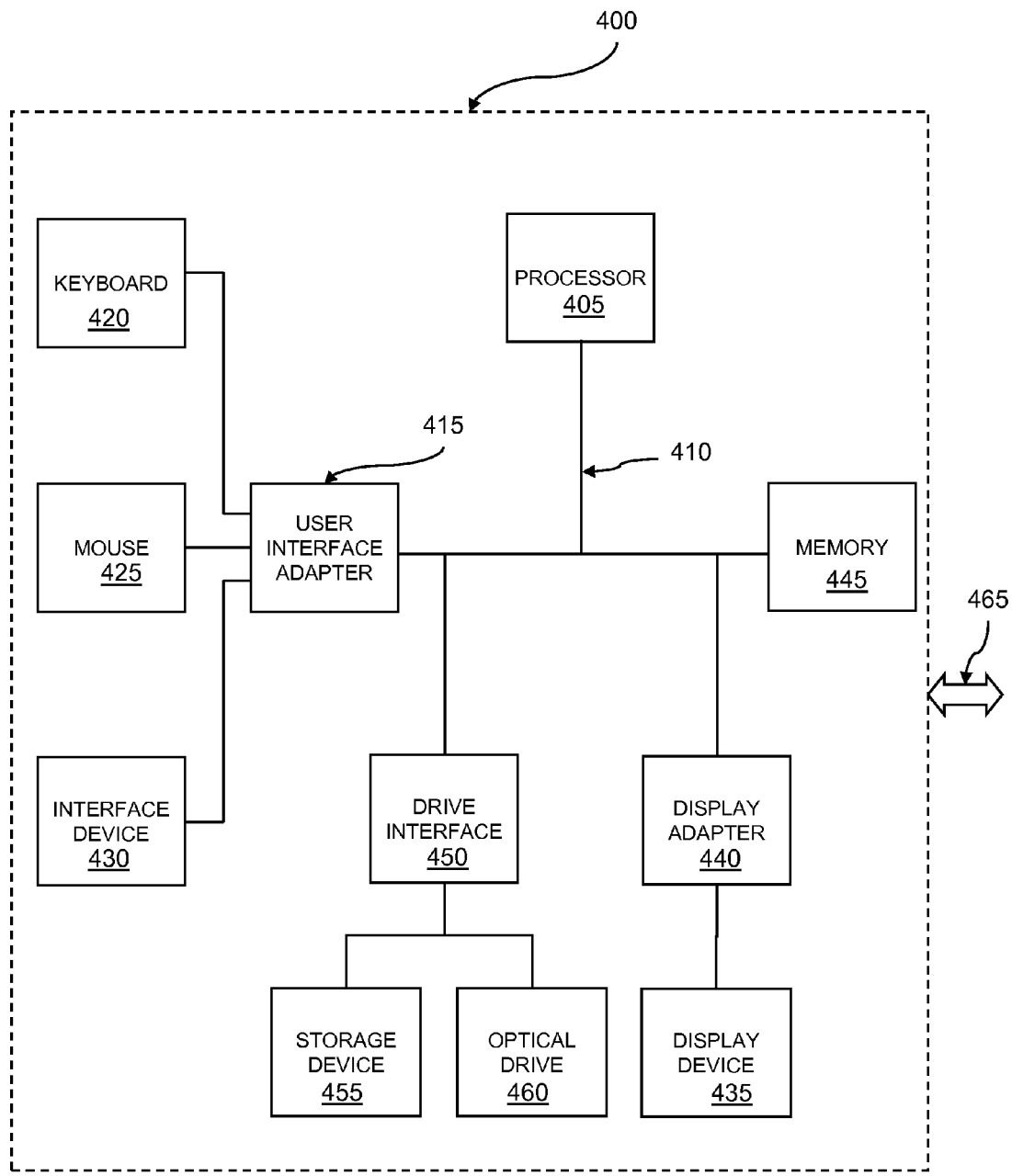
FIG. 4 is a block diagram of a computer environment in which the presently preferred embodiment may be practiced.

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method for defining part interfaces. Now therefore, in accordance with the presently preferred embodiment, an operating system executes on a computer, such as a general-purpose personal computer. FIG. 4 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implement particular abstract data types. The presently preferred embodiment may be performed in any of a variety of known computing environments.

Referring to FIG. 4, an exemplary system for implementing the presently preferred embodiment includes a general-purpose computing device in the form of a computer 400, such as a desktop or laptop computer, including a plurality of related peripheral devices (not depicted). The computer 400 includes a microprocessor 405 and a bus 410 employed to connect and enable communication between the microprocessor 405 and a plurality of components of the computer 400 in accordance with known techniques. The bus 410 may be any of several types of bus structures including a memory bus or memory controller, a peripheral bus, and a local bus using any of a variety of bus architectures. The computer 400 typically includes a user interface adapter 415, which connects the microprocessor 405 via the bus 410 to one or more interface devices, such as a keyboard 420, mouse 425, and/or other interface devices 430, which can be any user interface device, such as a touch sensitive screen, digitized pen entry pad, etc. The bus 410 also connects a display device 435, such as an LCD screen or monitor, to the microprocessor 405 via a display adapter 440. The bus 410 also connects the microprocessor 405 to a memory 445, which can include ROM, RAM, etc.

The computer 400 further includes a drive interface 450 that couples at least one storage device 455 and/or at least one optical drive 460 to the bus. The storage device 455 can include a hard disk drive, not shown, for reading and writing to a disk, a magnetic disk drive, not shown, for reading from or writing to a removable magnetic disk drive. Likewise the optical drive 460 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 400.

The computer 400 can communicate via a communications channel 465 with other computers or networks of computers. The computer 400 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 445 of the computer 400. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

Method for Defining Part Interfaces

Figure 1:
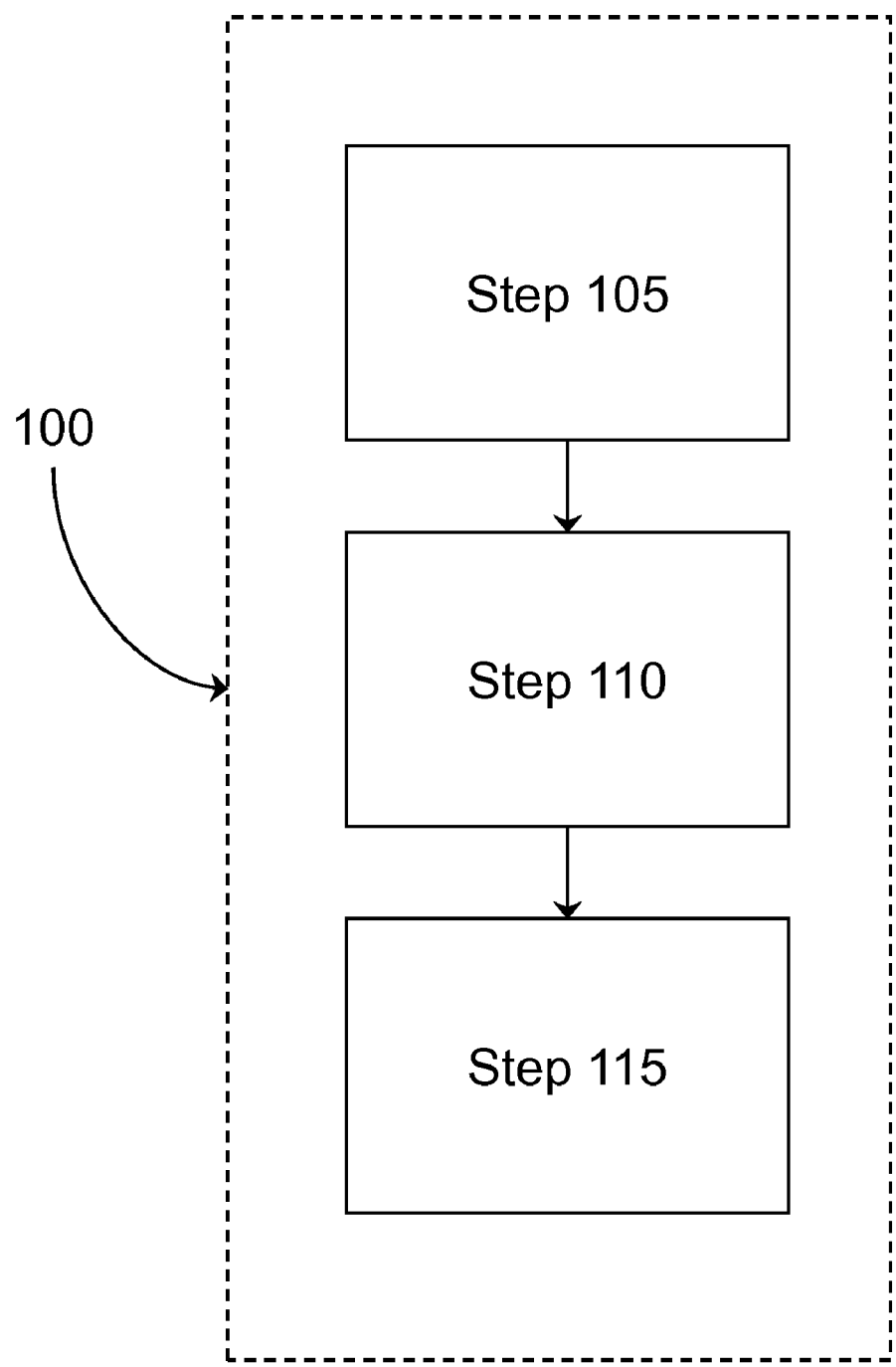
FIG. 1 is a logic flow diagram of the method employed by the presently preferred embodiment.

FIG. 1 is a logic flow diagram of the method employed by the presently preferred embodiment. Referring to FIG. 1, display a part to a user (Step 105) in a computer implemented method for defining part interfaces 100. Next, access a rule view corresponding to said part (Step 110). Finally, set a rule to a reference use in said rule view (Step 115) so that said rule limits said part to said reference use by a plurality of other parts. These methods of defining part interfaces in accordance with the presently preferred embodiment are set forth in more detail below.

Step 1

Figure 2:
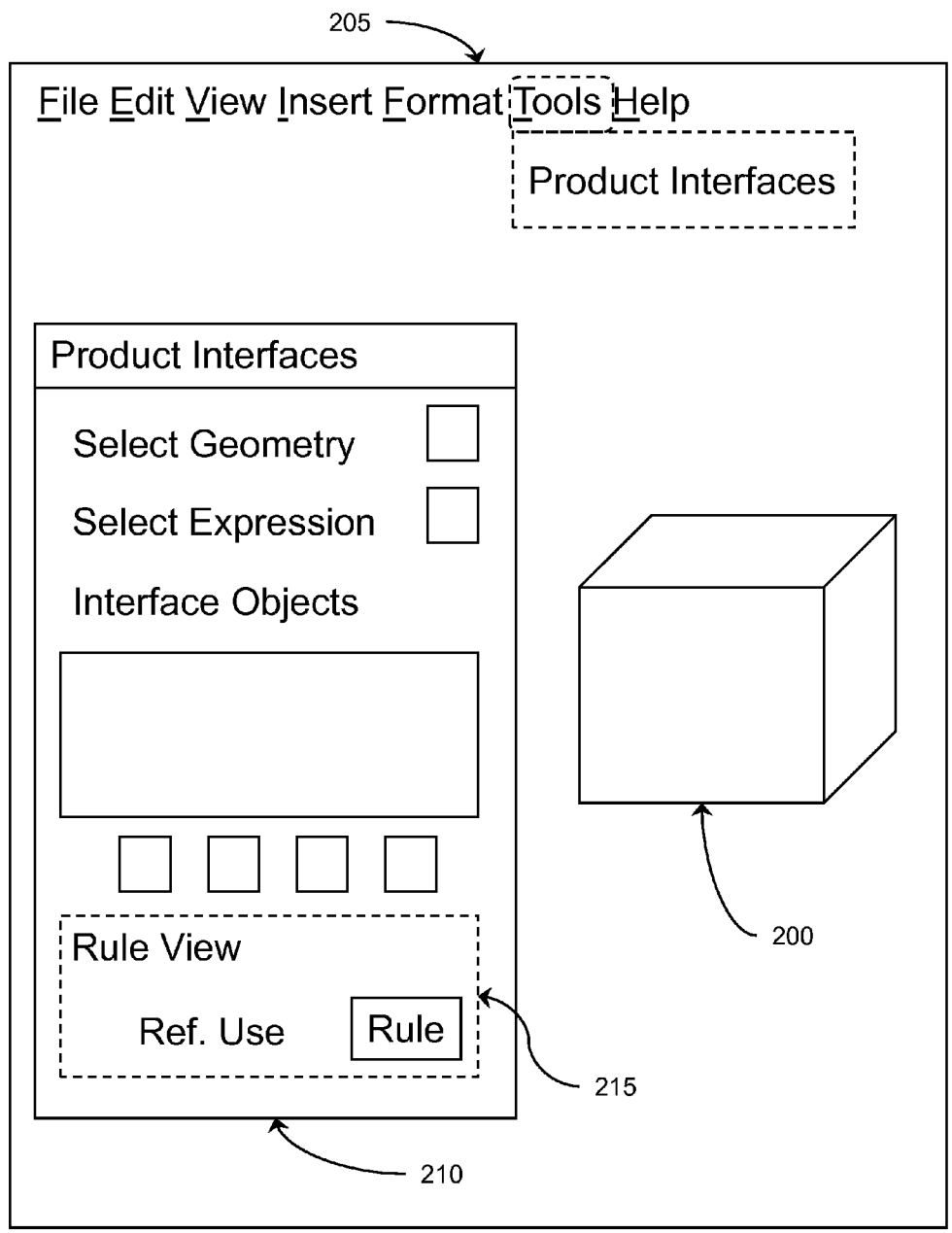
FIG. 2 is an illustration of a windowed interface.

FIG. 2 is an illustration of a windowed interface. Referring to FIG. 2, utilizing a computer aided design (CAD) application, the user selects a part 200 to view in a windowed display 205 (Step 105). In accordance with the presently preferred embodiment, the user initiates the association of at least one rule to the part 200 by activating a dialog window 210.

Step 2

Figure 3:
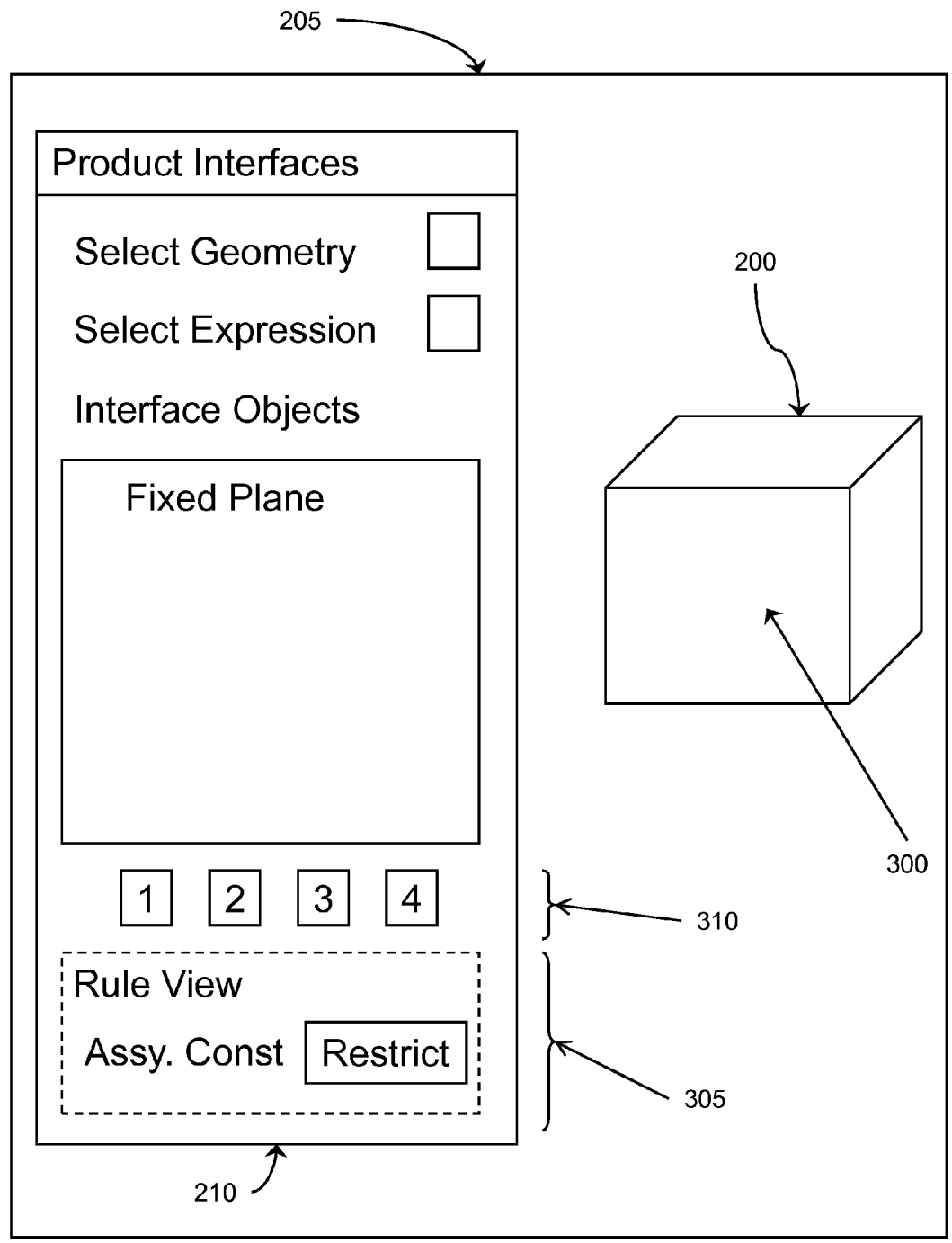
FIG. 3 is a windowed interface illustrating a selection interface object.

With the dialog window 210 in view, the user can codify a design intent by accessing a rule view 215 that corresponds to the part 200 in display. When accessing the rule view 215, the user has a visual indication as to what are the reference uses, how many there are, and the corresponding default rules associated (Step 110). Example reference uses include "Part Linking" and "Assembly Constraints." Example rules include "Allow Selection of Any Geometry or Expression," "Encourage Use of Interface Objects," and "Restrict Selection to Only Interface Objects." As shown in FIG. 3, "Restrict" illustrates "Restrict Selection to Only Interface Objects" but it is understood that "Restrict" alternatively could be phrased "Allow" or "Encourage" to illustrate "Allow Selection of Any Geometry or Expression" or "Encourage Use of Interface Objects," respectively.

Step 3

In the rule view 215, the user can set the rule to the reference use, for example, set "Allow Selection of Any Geometry or Expression" to "Part Linking" (Step 115), so as to restrict "part linking" to any geometry or expression, which allows the user to un-restrict the use of the part 200 when referencing other parts. In practice, the part 200 may have multiple interfaces by multiple users, but it is the original user, i.e., the owner, of the interface that has restricted the linking property of the part 200. The result of which is the owner of the interface determines if other parts are allowed to reference objects that are not in the interface when linking inter-part geometry, also referred to as inter-part linking.

Step 4

FIG. 3 is a windowed interface illustrating a selection interface object. Referring to FIG. 3, the user can select a geometric object or an expression, or both, subject to the interface constraints imposed by the owner of the interface. The part has the reference use of "Assembly Constraint" to "Restrict Selection to Only Interface Objects." Illustrated at 305 is where the user has imposed the "Restrict Selection to Only Interface Objects" as denoted by the term "Restrict". With that rule/restriction in place, the user selects the geometric object referenced in this Figure as a fixed plane 300 as an interface object for other objects to interface with. Given the restriction imposed by the parts, other parts can be interfaced to the current part through the interface object, e.g., the fixed plan 300.

Step 5

At this point, the owner of the interface could add another geometric object or an expression to the interface objects.

Likewise, a number of functions are available to perform additional actions on the interface objects, such as "Remove from Interface," "Properties," "Where Referenced," and "Information" shown at 1, 2, 3, and 4, respectively.

Example

In an example scenario based upon the presently preferred embodiment, where a user intends to virtually mount an engine into a car utilizing a CAD application, like NX® from Siemens Product Lifecycle Management Software, Inc., that engine has geometry that represents the engine mounts some of which will be part of the engine's interface. In this example, one designer designs the engine mounts, e.g., some type of heavy duty flange with bolt holes in it, and positions the bolts in the assembly. A second designer is responsible for designing the mounting area that the engine mounts will attach to on the car body.

The user that designs the mounts on the engine will want to identify specific pieces of geometry on those mounts as part of the interface for the engine. Specifically, the hole for the mounting bolt and the face on the engine mount that will sit on the car body mounting face. The expectation is that the designer of the car body will build mounting areas that can hold the engine mounts, i.e., are the right size and shape, and are in the right position. In order to specify which geometry is part of the engine mount's interface, it's expected that the designer will invoke a dialog in the CAD application. The expectation is that the interface will be identified after the engine mount parts are designed rather than during the design. However, it should be possible to invoke the dialog multiple times and to add or remove geometry from the set of identified interfaces. Put another way, the designer of a product has specific geometry and expressions that he intends users of his product to reference or, e.g., by linking to, when interacting with his product. If designers that interact with the product all reference the intended geometry, then the designer of the product can try to keep those areas as stable (non-changing) as possible. This reduces the need for rework of the downstream designs that interact with the product when minor changes are made.

Continuing, the designer of the mounting area(s) will want to link some geometry from the engine mount interface in order to design the mounting areas. Utilizing the Geometry Linker (or perhaps to the Copy Geometry From Part) dialog, the interface objects in the engine mount part should be easily identifiable so that they can be selected in the graphics window. It will also be obvious when an object is selected that is not part of the interface. It is important to note that the designer of the engine mounts on the engine will expect to be able to find out what parts are referencing the geometry/objects identified as part of his interface (see below). It's equally true that the designer creating objects that reference the interface objects will not have write access to the engine part files. Put another way, the designer interacting with a part that has a defined interface wants to reference things in the interface so that he can gain all of the benefits described in the scenario above (more stability when minor changes are made to the product interacting with). Here the user needs to be able to know what's in the interface easily at the time of reference creation. This will ensure that designers interacting with a product will use the intended objects.

Further, should the user be asked to make a design change to the engine mounts on the engine, and knows that this will have some impact on his interface objects. Being a conscientious designer, there is the desire to determine what existing parts will be impacted, and what that impact will be. The benefits of being able to know the impact of a change are: (1) the ability to communicate to the users of the interface that the change is about to happen (by determining the owners of the parts that reference the interface); (2) the ability to review the current usage, and give advice on how to cope with the change; and (3) the ability to conduct an impact study to defend for or against making the prescribed change in the first place. A key decision the owner of the part is trying to make is whether the change can just be saved with the current revision, has to be saved with a new revision or has to be saved as a new part number. It is costly to introduce new part numbers, and even a new revision incurs a new cost so designers try to avoid this as much as possible.

CONCLUSION

From Step 1 through Step 5, the presently preferred embodiment has disclosed complete solution to define part interfaces. The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be an assembled, compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application2-specific integrated circuits).

A number of embodiments have been described. It will be understood that various modifications may be made without departing from the spirit and scope of the presently preferred embodiment. Therefore, other implementations are within the scope of the following claims.

What is claimed is:

1. A computer implemented method for defining part interfaces, comprising:
   selecting a part;
   accessing a rule view corresponding to said part, the rule view displaying existing reference uses, the number of existing reference uses, and corresponding default rules associated with the part; and
   setting a rule to an existing reference use, wherein said rule limits said part to said reference use for a plurality of other parts.

2. The method of claim 1, further comprising displaying said part to a user.

3. The method of claim 1, wherein said setting said rule to said reference use occurs in said rule view.

4. The method of claim 1, wherein said reference use is an inter-part linking.

5. The method of claim 1, wherein said reference use is an assembly constraint.

6. The method of claim 1, wherein said rule is one of an allow, an encourage, and a restrict.

7. The method of claim 1, wherein an owner sets said rule to said reference use.

8. The method of claim 7, wherein said owner restricts a linking property of said part.

9. The method of claim 8, wherein said linking property is an intra-part linking property.

10. A non-transitory machine readable medium encoded with instructions that, when executed, cause a computer to:
   select a part;
   access a rule view corresponding to said part, the rule view displaying existing reference uses, the number of existing reference uses, and corresponding default rules associated with the part; and
   set a rule to an existing reference use, wherein said rule limits said part to said reference use for a plurality of other parts.

11. The machine readable medium of claim 10, further comprising instructions to display said part to a user.

12. The machine readable medium of claim 10, wherein said setting said rule to said reference use occurs in said rule view.

13. The machine readable medium of claim 10, wherein said reference use is an inter-part linking.

14. The machine readable medium of claim 10, wherein said reference use is an assembly constraint.

15. The machine readable medium of claim 10, wherein said rule is one of an allow, an encourage, and a restrict.

16. The machine readable medium of claim 10, wherein an owner sets said rule to said reference use.

17. The machine readable medium of claim 16, wherein said owner restricts a linking property of said part.

18. The machine readable medium of claim 17, wherein said linking property is an intra-part linking property.

19. A data processing system comprising:
   a processor; and
   an accessible memory; the data processing system configured to
   select a part;
   access a rule view corresponding to said part, the rule view displaying existing reference uses, the number of existing reference uses, and corresponding default rules associated with the part; and
   set a rule to a reference use.

20. The data process system of claim 19, the data processing system further configure to restrict a linking property of said part.

* * * * *